Patented Aug. 22, 1944

2,356,172

UNITED STATES PATENT OFFICE 2,356,172

SALTS OF MERCAPTANS

Roger A. Mathes, Akron, Ohio, assignor to The B. F. Goodrich Company, New York, N. Y., a corporation of New York No Drawing. Application December 30, 1941, Serial No. 424,895

10 Claims. (Cl. 260—302)

This invention relates to a new composition of matter and pertains specifically to the reaction products of aminoalkyl sulfides with the zinc salts to heterocyclic nitrogen-containing mercaptans.

These new compounds are useful particularly as insecticides, fungicides, or as accelerators for the vulcanization of rubber. The products of the reaction between compounds from the above two classes are believed to be addition products. The reaction may be carried out in an aqueous dispersion, or in alcohol, gasoline, benzene, or the like, and it is usually desirable to heat the reaction mixture to about 50° to 80° C. to insure completion of the reaction.

Among the heterocyclic nitrogen-containing mercaptans of which the zinc salts may be used to prepare my new compound are the mercaptothiazoles, the mercaptothiazolines, the mercaptooxazoles, the mercapto-oxazolines, the mercaptoimidazoles, the mercapto-imidazolines, the mercaptothiodiazoles, the mercaptothiazines, the mercaptoquinolines, and other similar compounds. The aminoalkyl sulfides with which the zinc salts of these materials may be reacted to produce my new chemical compounds include the aminoalkyl hydrosulfides (mercaptans) as well as the di(aminoalkyl) sulfides and polysulfides containing no more than four sulfur atoms. The amino group may have its hydrogen atoms replaced by hydrocarbon groups, such as methyl, ethyl, phenyl, etc. The alkyl chain between the sulfur and nitrogen atoms may contain no more than three carbon atoms, although it may have a hydrocarbon side-chain such as methyl, ethyl, butyl, phenyl, etc. Among the compounds which may be used are 1,1'-diaminodimethyl mono-, di-, or tetrasulfide; 2,2'-diaminodiethyl mono-, di-, or tetrasulfide; 2,2'-diaminodi-n-propyl mono-, di-, or tetrasulfide; 2,2'-diethyl-3,3'-diaminodi-n-propyl mono-, di-, or tetrasulfide; 2,2'-diphenyl-3,3' - diaminodi - n - propyl mono-, di-, or tetrasulfide; 3,3'-diaminodi-n-propyl mono-, di-, or tetrasulfide; N,N'-dimethyl-2,2'-diaminodiethyl mono-, di-, or tetrasulfide; N,N'-dimethyl-N,N'-diethyl-2,2' - diamino - n - propyl mono-, di-, or tetrasulfide; N,N'-diphenyl-3,3'-di-n-propyl mono-, di-, or tetrasulfide; aminomethyl mercaptan; 2-aminoethyl mercaptan; 2-amino-n-propyl mercaptan; N-phenyl-2-aminoethyl mercaptan; N,N-dimethyl-2-amino-n-propyl mercaptan; N-ethyl-3-amino-n-propyl mercaptan; N - methyl-N-ethyl - 2 - aminoethyl mercaptan; 2-phenyl-3-amino-n-propyl mercaptan; and other similar compounds.

The following specific examples will further illustrate my invention:

Example I

A suspension of 18.3 parts by weight of the zinc salt of 2-mercaptothiazoline in 135 parts of benzene is heated to about 70° C., when 12.0 parts by weight of 2,2'-diaminodiethyl monosulfide are added with stirring. The reaction takes place immediately, a gummy material being formed. After filtration and washing with benzene, hexane, and water, 23.3 parts of hard solid are obtained which may be ground to an almost white powder.

Example II

A suspension of 98 parts by weight of the zinc salt of 2-mercapto-4-methylthiazole in 900 parts of benzene is heated to about 60° C.; there are added slowly, with stirring, 120 parts of 2,2'-diaminodiethyl monosulfide. A reaction takes place immediately, giving rise to a gummy product. After filtration and washing with hot xylene, a solid material is obtained; evaporation of the xylene used for washing yields an oily material believed to be unreacted 2,2'-diaminodiethyl monosulfide.

Example III

A suspension of 183 parts of the zinc salt of 2-mercapto-thiazoline in 1350 parts of benzene is heated to about 70° C.; upon the addition of 152 parts of 2,2'-diaminodiethyl disulfide, $(NH_2-CH_2-CH_2)_2S_2$, slowly, and with stirring, an immediate reaction takes place with the formation of a gummy material. After filtration and washing with benzene, hexane, and water, 245 parts of hard resinous material are obtained which may be ground to a buff-colored powder.

Example IV

To a solution of 353 parts by weight of the zinc salt of 2-mercapto-4,5-dimethyl-thiazole in 2250 parts of benzene are added 120 parts of 2,2'-diaminodiethyl monosulfide, $(NH_2-CH_2-CH_2)_2S$. An immediate reaction occurs, followed by precipitation of a gummy solid. The mixture is heated to reflux temperature for a few minutes to insure completion of the reaction. After filtration and drying 462 parts of light buff powder are obtained.

Example V

To a solution of 353 parts by weight of the zinc salt of 2-mercapto-4,5-dimethylthiazole in 2250 parts of benzene are added 152 parts of 2,2'-diaminodiethyl disulfide. An immediate reaction takes place, yielding a sticky soft resinous material. After evaporation of the benzene there remain 495 parts of a brittle solid which may be ground to a fine powder.

As an indication of the effectiveness of my new compounds in accelerating the vulcanization of rubber, I have prepared the following rubber composition, in which the parts are by weight:

| | |
|---|---|
| Rubber | 100 |
| Zinc oxide | 5 |
| Sulfur | 3 |
| Accelerator | 1 |

When the products of Examples I and II above are used as the accelerator in this composition and the vulcanization is carried out at 287° F. for 30 minutes, the resulting rubber stocks have tensile strengths of more than 3000 lbs. per sq. in. By adding one part of a fatty acid to the composition, the effectiveness of the accelerator may be greatly increased. When the products of Examples II to V, above, are incorporated in the same rubber composition with the addition of one part of lauric acid, and the vulcanization is carried out under the same conditions, the resulting stocks all have tensile strengths of more than 3500 lbs. per sq. in.

My new compounds can be used to accelerate the vulcanization of any rubber, natural or synthetic, which can be vulcanized with sulfur, such as caoutchouc, balata, gutta percha, latex, artificial rubber isomers, and copolymers of conjugated diene hydrocarbons with other copolymerizable monomers, e. g. copolymers of butadiene with either styrene, acrylonitrile, methyl acrylate, methyl methacrylate, or the like. The presence of any of the usual pigments, dyes, fillers, softeners, antioxidants, other accelerators, etc., has no deleterious effect on the accelerating action of my new compounds. It is desirable to use an organic acid such as lauric acid or other fatty acid, or a metal salt of such acid, in conjunction with my new accelerators, although the presence of the acid is not essential.

Any of the usual methods of vulcanization, such as heating in a mold, in hot water, steam, hot air, etc., gives a satisfactory product with my new compounds.

The rubber stocks made with my accelerators are not limited in their use, but are applicable to a wide variety of products, such as pneumatic and solid tires, belts, hose, footwear, latex-dipped goods, surgical goods, all kinds of molded products, and the like.

My new compounds, although having other uses, are particularly valuable as accelerators for the vulcanization of rubber; for that reason I have described in detail this application of these compounds.

Although I have herein disclosed specific examples of my invention, I do not intend to limit myself solely thereto, but only as indicated by the appended claims.

I claim:

1. A composition of matter comprising the addition product of a zinc salt of a heterocyclic nitrogen-containing mercaptan with an aminoalkyl sulfide which contains no more than four sulfur atoms, and no more than three carbon atoms in the alkyl chain between the sulfur and nitrogen atoms, said aminoalkyl group containing no substituent groups other than hydrogen and hydrocarbon groups.

2. A composition of matter comprising the addition product of a zinc salt of a heterocyclic nitrogen-containing mercaptan with an aminoalkyl mercaptan which contains no more than three carbon atoms in the alkyl chain between the sulfur and nitrogen atoms, said aminoalkyl group containing no substituent groups other than hydrogen and hydrocarbon groups.

3. A composition of matter comprising the addition product of a zinc salt of a heterocyclic nitrogen-containing mercaptan with a di(aminoalkyl) monosulfide which contains no more than three carbon atoms in the alkyl chain between the sulfur and nitrogen atoms, said aminoalkyl group containing no substituent groups other than hydrogen and hydrocarbon groups.

4. A composition of matter comprising the addition product of a zinc salt of a heterocyclic nitrogen-containing mercaptan with a di(aminoalkyl) polysulfide which contains no more than four sulfur atoms, and no more than three carbon atoms in the alkyl chain between the sulfur and nitrogen atoms, said aminoalkyl group containing no substituent groups other than hydrogen and hydrocarbon groups.

5. A composition of matter comprising the addition product of a zinc salt of a heterocyclic nitrogen-containing mercaptan with 2-aminoethyl mercaptan.

6. A composition of matter comprising the addition product of a zinc salt of a heterocyclic nitrogen-containing mercaptan with 2,2'-diaminodiethyl monosulfide.

7. A composition of matter comprising the addition product of a zinc salt of a heterocyclic nitrogen-containing mercaptan with 2,2'-diaminodiethyl disulfide.

8. A composition of matter comprising the addition product of the zinc salt of 2-mercapto-4,5-dimethylthiazole with 2-aminoethyl mercaptan.

9. A composition of matter comprising the addition product of the zinc salt of 2-mercapto-4,5-dimethylthiazole with 2,2'-diaminodiethyl monosulfide.

10. A composition of matter comprising the addition product of the zinc salt of 2-mercapto-5-ethylthiazole with 2,2'-diaminodiethyl disulfide.

ROGER A. MATHES.